United States Patent

Brainard

[11] Patent Number: 5,371,456
[45] Date of Patent: Dec. 6, 1994

[54] POWER SUPPLY AND BATTERY CHARGING SYSTEM

[76] Inventor: Gerald L. Brainard, 1366 Stephen Way, San Jose, Calif. 95129

[21] Appl. No.: 103,733

[22] Filed: Aug. 6, 1993

Related U.S. Application Data

[63] Continuation of Ser. No. 853,364, Mar. 18, 1992, abandoned.

[51] Int. Cl.$^5$ .................. H01M 10/44; H02J 7/04
[52] U.S. Cl. ........................................ 320/31; 320/23
[58] Field of Search ................... 320/31, 32, 22, 23

[56] References Cited

U.S. PATENT DOCUMENTS

| | | | |
|---|---|---|---|
| 4,140,957 | 2/1979 | Rapp | 320/2 |
| 4,315,162 | 2/1982 | Ferguson | 307/66 |
| 4,394,612 | 7/1983 | Emerle et al. | 320/31 |
| 4,595,872 | 6/1986 | Ball | 320/13 |
| 4,673,861 | 6/1987 | Dubovsky et al. | 320/2 |
| 4,709,202 | 11/1987 | Koenck et al. | 320/43 |
| 4,712,055 | 12/1987 | Houser, Jr. | 320/35 |
| 4,724,528 | 2/1988 | Eaton | 364/715 |
| 4,737,702 | 4/1988 | Koenck | 320/40 |
| 4,757,505 | 7/1988 | Marrington et al. | 371/66 |
| 4,823,323 | 4/1989 | Higuchi | 365/228 |
| 4,862,013 | 8/1989 | Konopka | 307/254 |
| 4,885,523 | 12/1989 | Koenck | 320/21 |
| 4,998,055 | 3/1991 | Nash et al. | 320/2 |
| 5,028,858 | 7/1991 | Schnizler et al. | 320/2 |
| 5,136,229 | 8/1992 | Galvin | 320/2 |
| 5,166,595 | 11/1992 | Leverich | 320/32 |

OTHER PUBLICATIONS

*Powering Portables Is A Challenge*, by Bruce Hamilton, Electronic Engineering Times, Jan. 27, 1992, pp. 46–53.

Primary Examiner—Steven L. Stephan
Assistant Examiner—Robert Nappi
Attorney, Agent, or Firm—David L. McCombs; Keith Hargrove

[57] ABSTRACT

A novel power charger apparatus is provided for supplying electrical power to an electrical device for operation or to a battery for charging, or both. The charger apparatus comprises a primary power supply for supplying power from an external power source to the power charger, a power converter coupled to the primary power supply for converting the power received by the primary power supply from the external power source into a form usable by the power charger, and a power controller coupled to the power converter for controlling the power applied to the device or the battery, or both, whereby, regardless of the rate of charge of the battery, a constant current is maintained for charging the battery while the voltage across the device and battery is allowed to vary. To observe the rate of charge of the battery, the power charger also includes a charge rate sensor connected to the battery and coupled to the power controller to measure the voltage across the battery.

18 Claims, 8 Drawing Sheets

POWER SUPPLY AND BATTERY CHARGING SYSTEM

This is a continuation of co-pending application Ser. No. 07/853,364 filed on Mar. 18, 1992 abandoned.

BACKGROUND OF THE INVENTION

This invention relates in general to power supplies and battery charging systems and, more particularly, to a battery charging system for portable electronic devices or electrically powered devices that can function as a universal power source for powering the portable device, charging the batteries, or both.

Portable electronic devices such as, for example, personal computers of the notebook, laptop, palmtop, or pen-based type, digital oscilloscopes, communications analyzers, surveying equipment, etc., usually have complex power supply requirements. For example, a portable computer typically drives a large display, a microprocessor, and a disk drive such as a floppy disk or hard drive, or both. Early "luggable" personal computers (PCs), used displays that were small cathode ray tubes (CRT) with floppy drives. Their power requirements were about 75 to 100 watts and required connection to a wall socket in order to meet such power requirements. Later, more portable computers, such as laptops, emerged. These newer systems eliminated CRTs and replaced them with low-power liquid crystal displays (LCDs); additionally, smaller disk drives requiring less space and power replaced the earlier larger drives. These newer systems reduced their power requirements sufficiently to enable them to operate on rechargeable batteries.

Figure 1A:
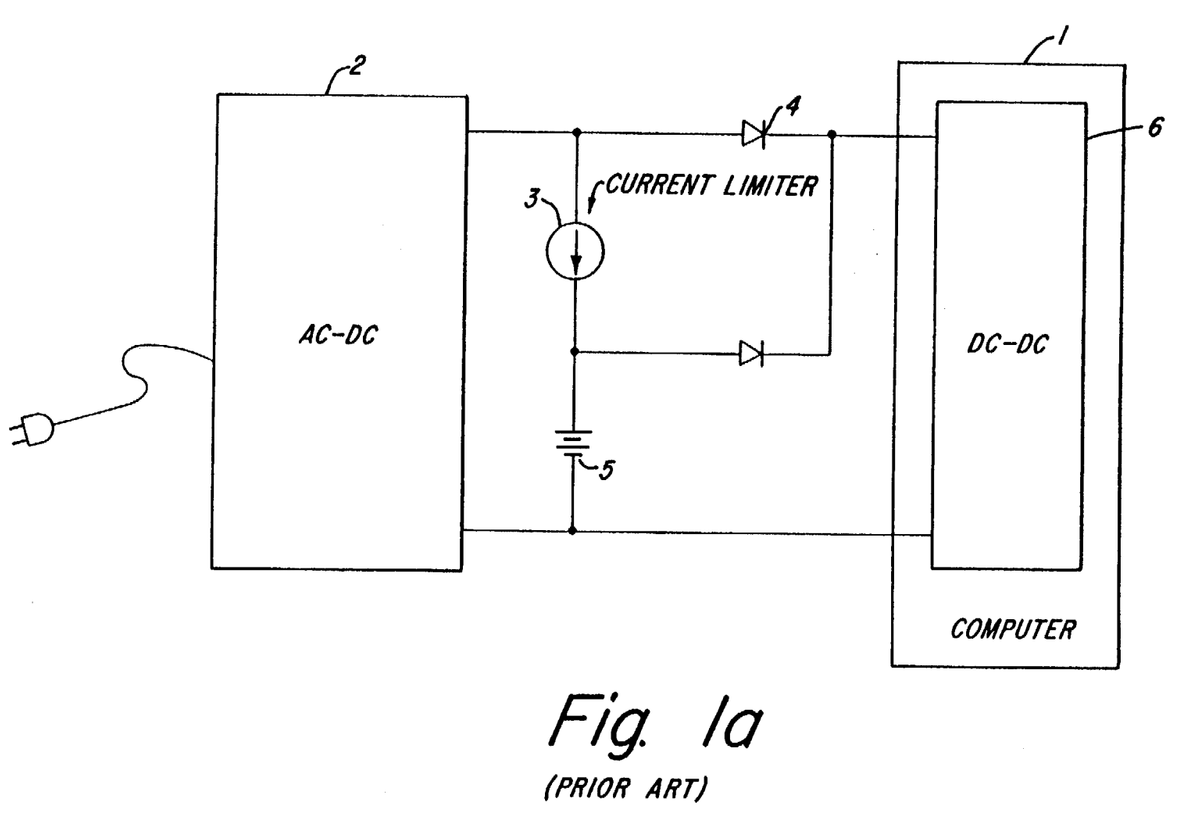
FIGS. 1A and 1B are block diagrams illustrating two known electrical power supplies for a portable computer.

Generally, as shown in FIG. 1A, a portable computer 1 uses a power supply that includes an AC adapter 2 (an external AC/DC switcher), some form of limited current 3 to trickle charge the battery, steering diodes 4 to isolate the battery 5 from the raw supply voltage and an internal DC/DC converter 6. The DC/DC converter operates from either the power external supply or 6 to 10 internal nickel/cadmium (NiCad) batteries, which supply power for about one to two hours. This tends to restrict charging to trickle charge currents and wastes power in the steering diodes, reducing battery discharge time.

To charge the battery rapidly, careful attention must be paid to the level of charge to prevent overcharging the battery. A common method to detect full charge is known as "negative delta V" ($-\Delta V$). This method detects the small negative change in voltage across the NiCad cell as it becomes fully charged. To prevent voltage fluctuations across the battery that could lead to false detection, the rapid charge current must be held constant and cannot be a function of the computer load current; or, the battery must be disconnected from the charger while measuring $-\Delta V$ as is done in the example shown in FIG. 1B.

Figure 1B:
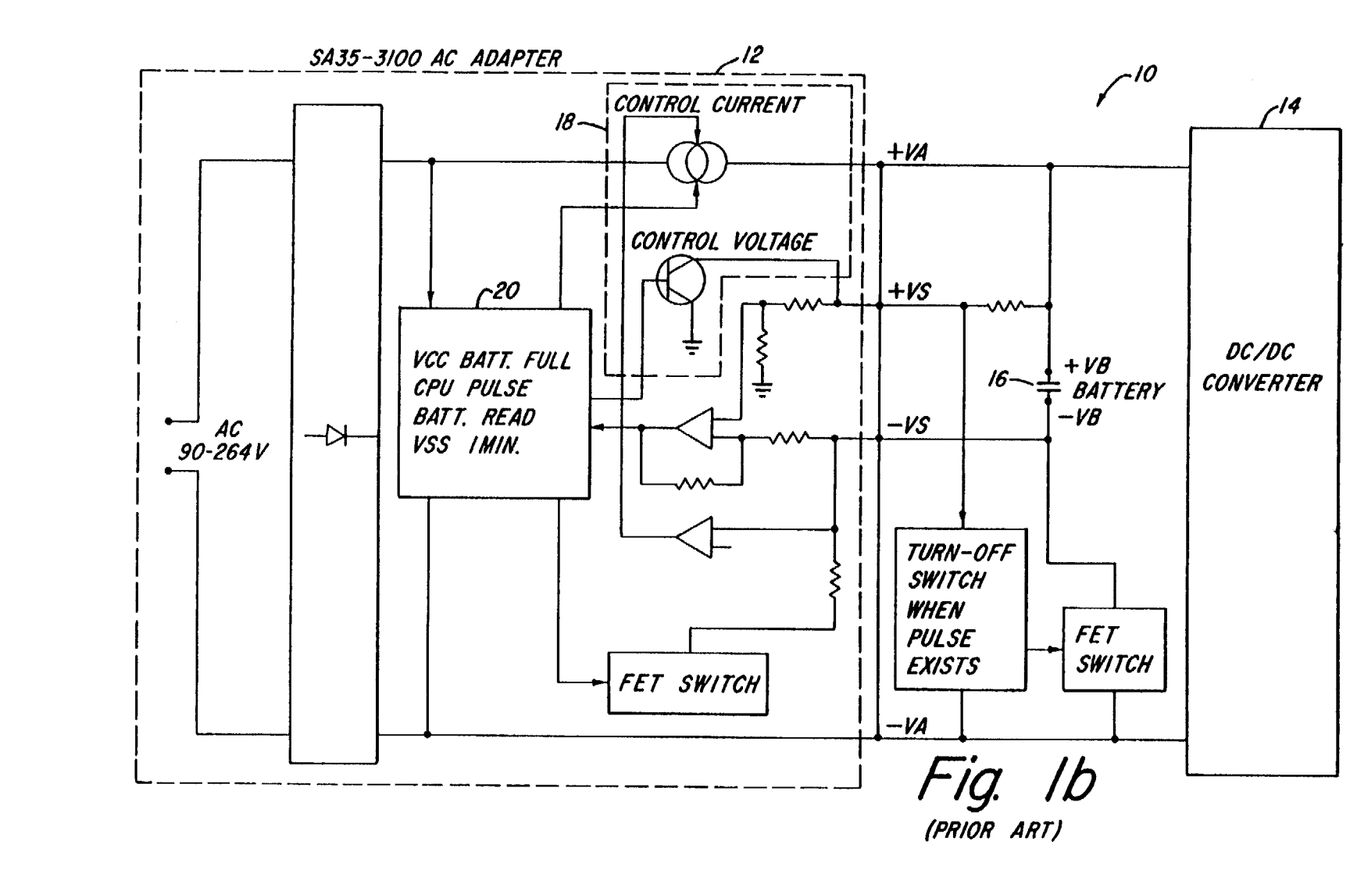

A known power supply 10 is shown in FIG 1B. Power supply 10 includes an AC adaptor 12, which has a wide range AC input and is capable of providing 35 Watts (W) of DC output to the device and batteries 16. While charging, a current control maintains constant current to the combination of battery 16 and a DC-DC converter 14. In this manner, as more current is drawn by DC-DC converter 14, less current is supplied to charge the battery. Four wires, +VA, +VS, −VA and −VS connect AC adaptor 12 to the DC-DC converter 14 and batteries 16. The power converter topology includes a two-field-effect-transistor (FET) forward converter 18 with both a current control and a maximum voltage control. AC adaptor 12 uses a $-\Delta V$ battery charging technique controlled by an internal processor 20. Power for DC-DC convertor 14 and battery charging is transferred over the +VA and −VA leads. Negative $\Delta V$ it measured across leads +VS and −VS. To prevent false readings, a FET switch in the negative lead of the battery is turned off while $-\Delta V$ is being measured. AC adaptor 12 reverts to a constant maximum voltage control when the battery becomes fully charged and is removed from the charging circuit by turning off the FET switch, or by physically removing the battery. To protect against over-charging the battery, AC adaptor 12 uses a battery-charge timer and a charge detector. The power-conversion circuits for the DC outputs are FET buck and boost converters operating at about 50 kilohertz (kHz). Because of the range of battery voltage while charging and discharging, DC-DC converter 14 is required to operate over a 2:1 voltage range. Typically, digital logic and analog application specific integrated circuits (ASICs) are used to minimize circuit space normally required for status and control signals.

This type of system, however, restricts rapid charging to periods when the computer is not being used and requires that the power supply/charging system be specifically designed for each battery/computer combination. Further, it is necessary to pulse the battery charging current off while $-\Delta V$ measurements are being made.

Accordingly, what is needed is an improved power supply-battery charging system for portable electronic devices that is more efficient, thereby optimizing battery discharge time. In addition, what is needed is a system that reduces the need for steering diodes, thereby decreasing the minimum voltage usage necessary to power a device. This improvement should also improve rapid charging in either stand alone use, i.e., without the computer, or in the battery-computer combination during system operation, and should charge various battery types without modification to the charger.

SUMMARY OF THE INVENTION

According to the present invention, a novel power charger apparatus is provided for supplying electrical power to an electrical device for operation or to a battery for charging, or to both. The charger apparatus comprises a primary power supply for supplying power from an external power source to the power charger, a power converter coupled to the primary power supply for converting the power received by the primary power supply from the external power source into a form usable by the power charger, and a power controller coupled to the power converter for controlling the power applied to the device or the battery, or both, whereby, regardless of the rate of charge of the battery, a constant current is maintained for charging the battery while the voltage across the device and battery is allowed to vary. The power charger also includes a charge rate sensor connected in series with the battery and coupled to the power controller for determining the state of the charge of the battery by measuring the voltage across the charge rate sensor.

The charge rate sensor comprises a variable resistance value and a voltage detector for measuring the voltage across the resistor while the battery is charging. The variable resistance value allows the battery to either rapid charge, trickle charge, or discharge (power the device). A charge monitor, connected to the battery and coupled to the power controller, monitors the battery during charging and signals the power controller the state of charge on the battery. Based on the monitoring by the charge monitor, the charge monitor and power controller place the battery into either a rapid charge, trickle charge, or power discharge state. The charge monitor uses either a temperature sensing system, a change of voltage sensing ($-\Delta V$) system, or a charge timing system, or any combination of the three.

The power controller uses a signal amplifier, such as an error amplifier, which has a constant signal input and a charge rate input from the charge rate sensor, and a control output, which is based upon the difference between the constant signal input and the charge rate input, to control the current across the battery. To provide a proper pulsewidth to maintain the desired current, the primary power supply uses a pulsewidth invertor responsive to the power controller. The invertor may be, for example, a current mode pulsewidth modulated flyback invertor. Also, a signalling device, for example, an LED coupled to a waveform generator and the power controller, provides a signal representative of the state of operation in which the power charger is operating, i.e. rapid charge, trickle charge, battery discharging, or charger-powered.

DETAILED DESCRIPTION OF THE SPECIFIC EMBODIMENTS

Figure 2:
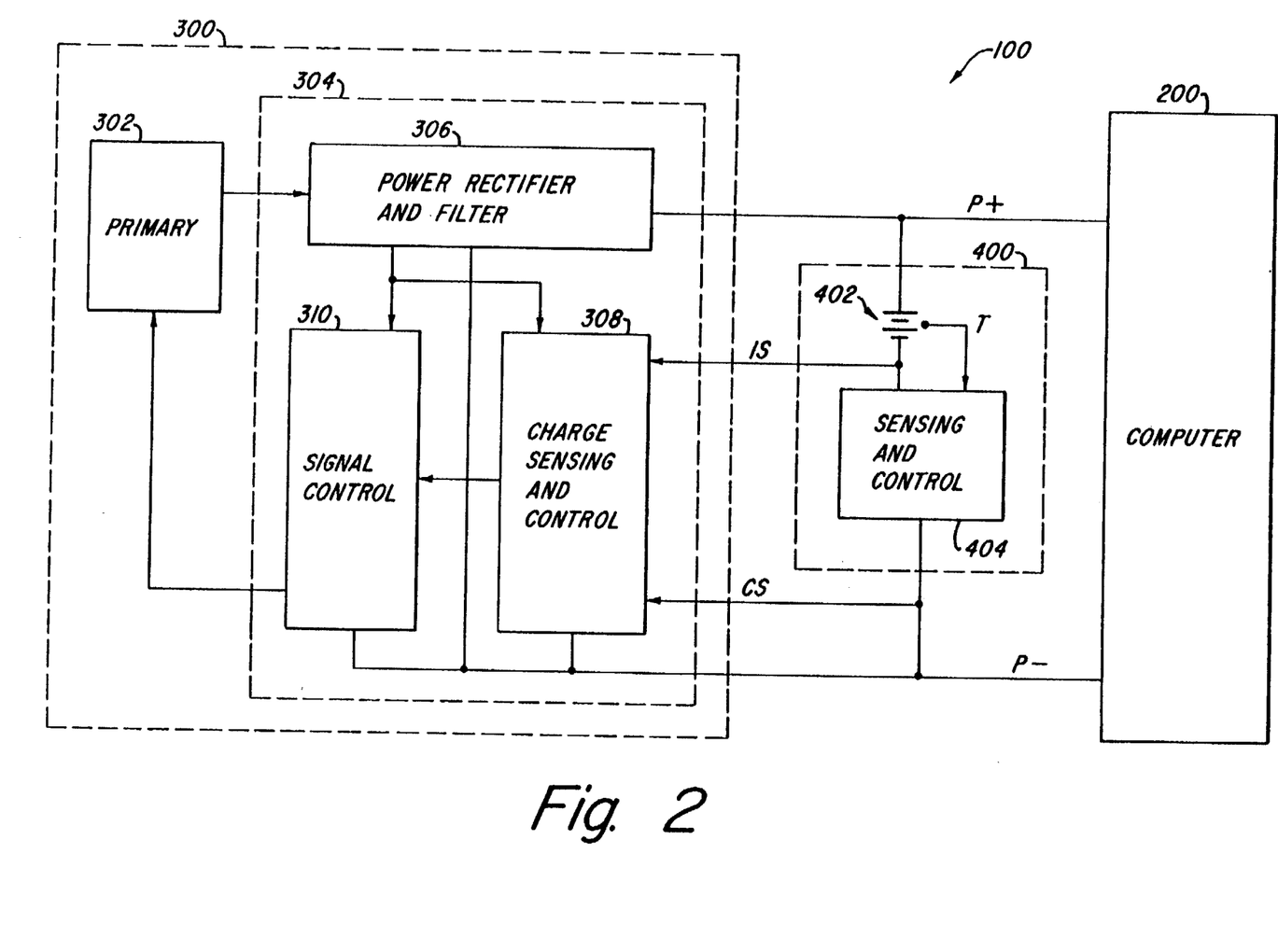
FIG. 2 is a block diagram illustrating the power supply-battery charger according to the present invention.

FIG. 2 illustrates a block diagram of a battery charger and power system 100 for use with an electronic device. For example, power system 100 may be adapted to operate a computer 200, such as a portable notebook computer. Connected in parallel with computer 200 is a charging unit or charger 300 and a battery pack 400.

Charger 300 further comprises a primary section 302 and a secondary section 304. Within secondary 304 there are a power rectifier and filter unit 306, a charge sensing and control circuit 308, and a signal control circuit 310. An exemplary embodiment of charger 300 is illustrated in FIG. 3.

Figure 4A:
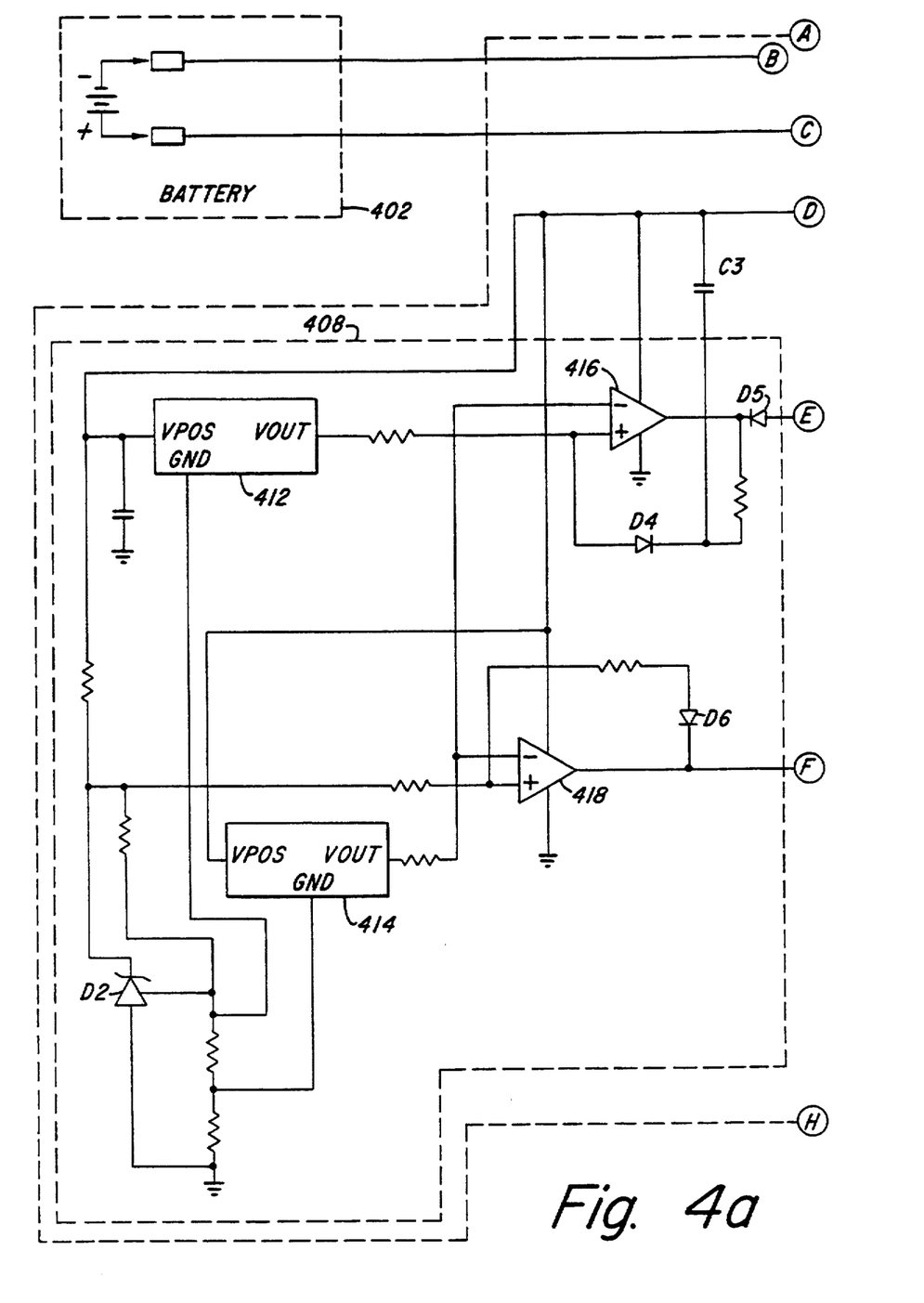
FIGS. 4A and 4B are a schematic illustration of the control circuitry and battery of the battery pack shown in FIG. 2.
Figure 4B:
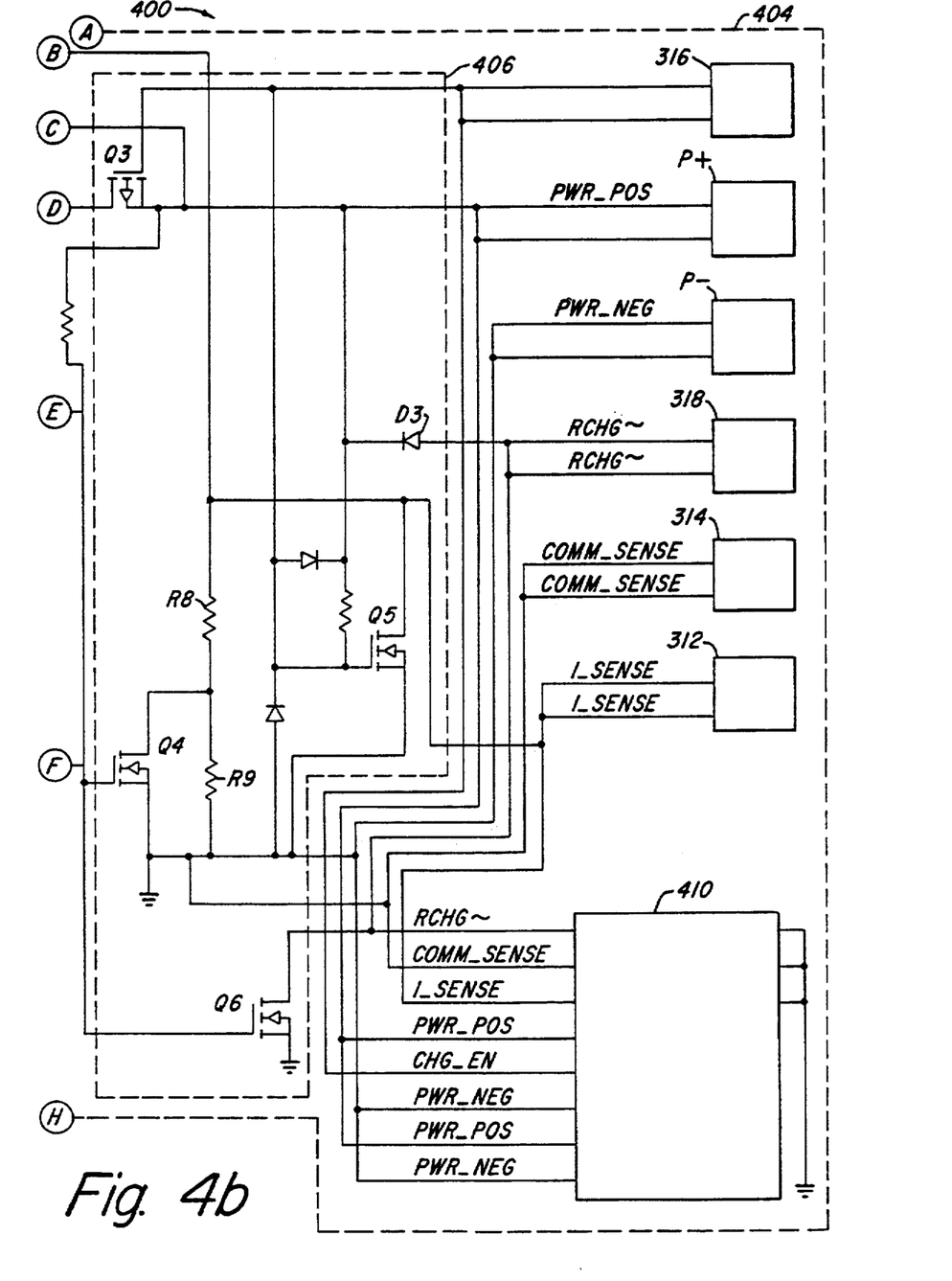

Battery pack 400 comprises a battery 402 connected to feedback and control circuitry 404. An exemplary embodiment of battery pack 400 is illustrated in FIG. 4.

Charger 300 is capable either of charging battery pack 400 or operating computer 200, or both simultaneously. If battery pack 400 is not present in the unit, charger 300 powers computer 200. If battery pack 400 is connected to charger 300, which is capable of sensing the presence of battery pack 400, charger 300 begins charging the battery pack while powering computer 200. Upon reaching a full charge, battery pack 400 is switched out of full charge operation and is placed in a trickle charge operation from charger 300. Since both battery pack 400 and computer 200 connect in parallel, with no separate means of current limiting between charger 300 and battery pack 400, charger 300 must monitor current through battery pack 400 and provide adequate voltage that will support the required charging current for battery pack 400. Accordingly, as battery pack 400 charges, the voltage increases across both battery pack 400 and computer 200. To continue powering computer 200 when battery pack 400 is removed, charger 400 must detect the absence of battery pack 400 and operate in a mode of constant voltage measured at an output of charger unit 300.

Figure 3A:
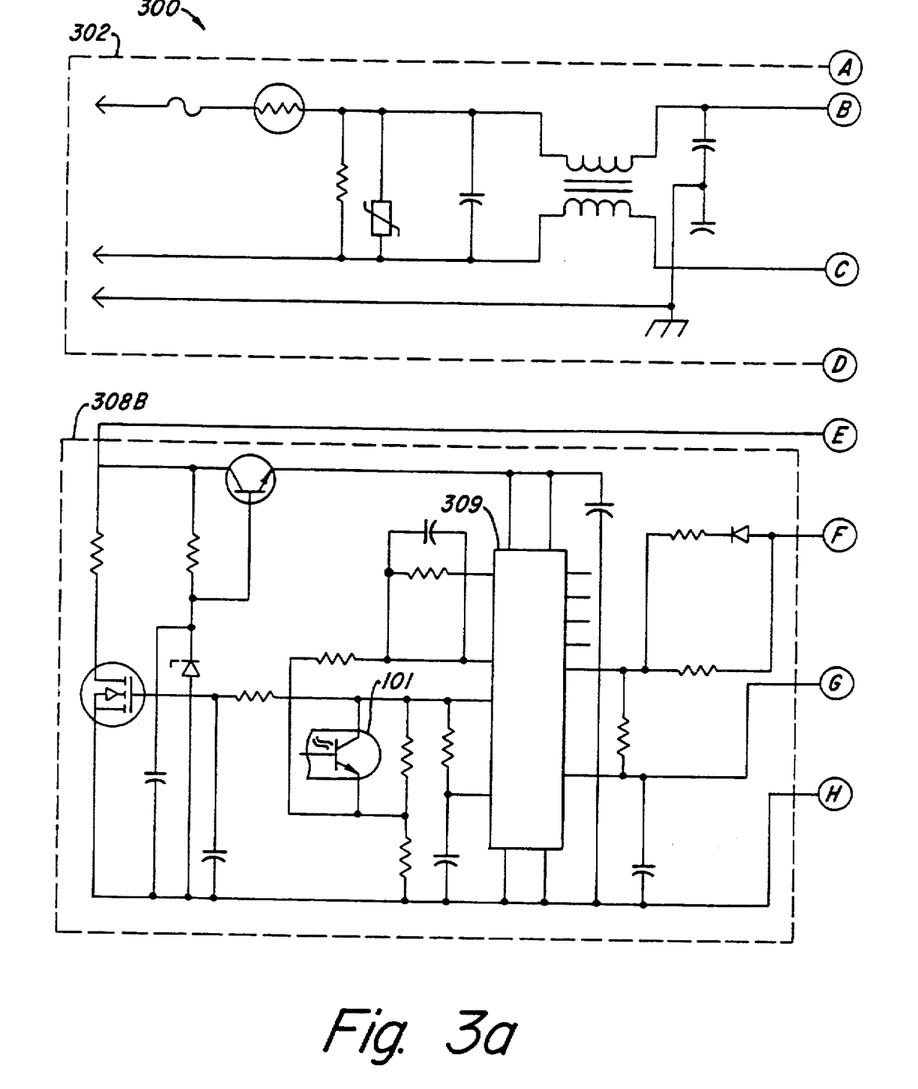
FIGS. 3A, 3B and 3C are a schematic diagram of the control and power circuitry of the power supply-battery charger shown in FIG. 2.
Figure 3B:
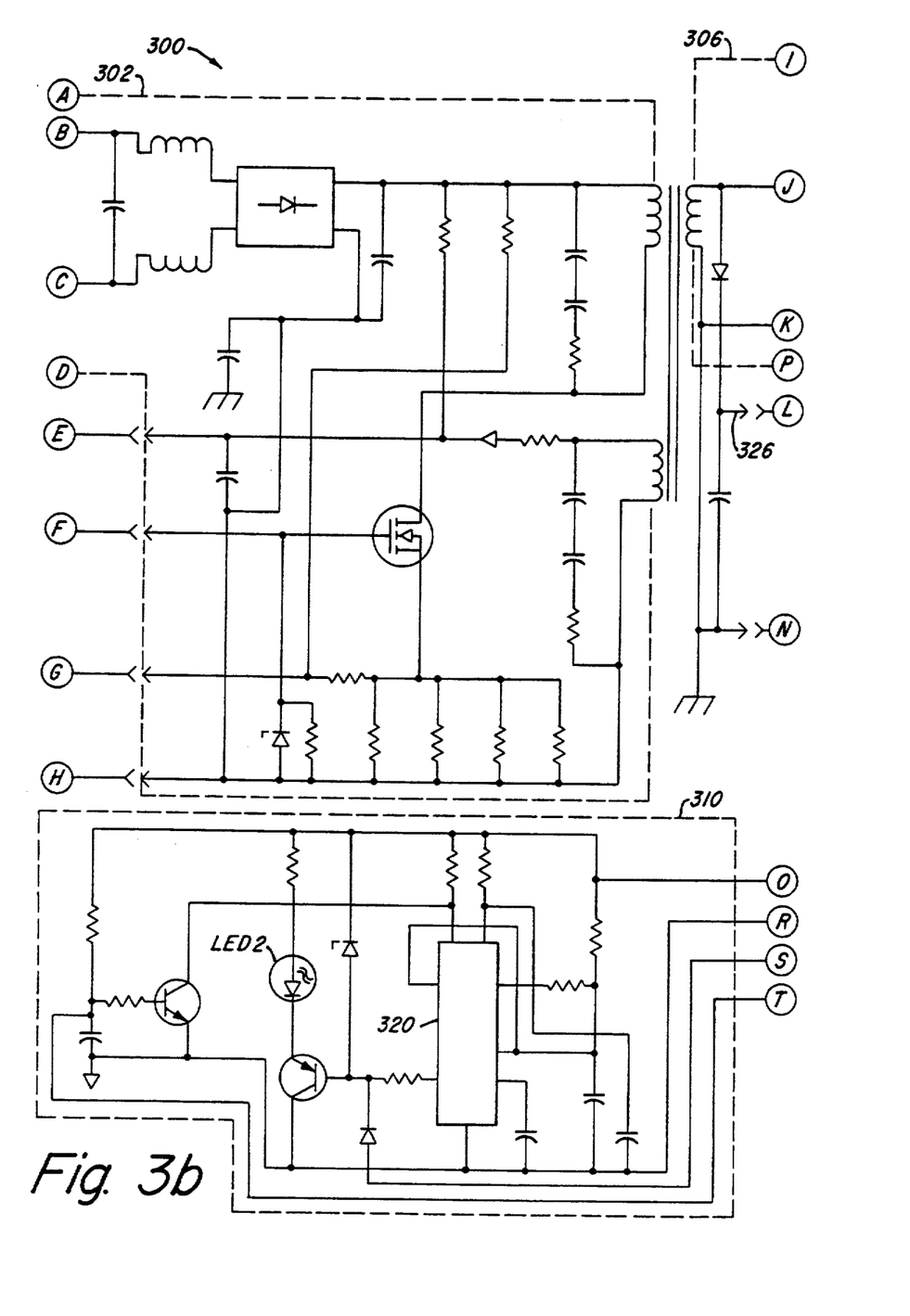
Figure 3C:
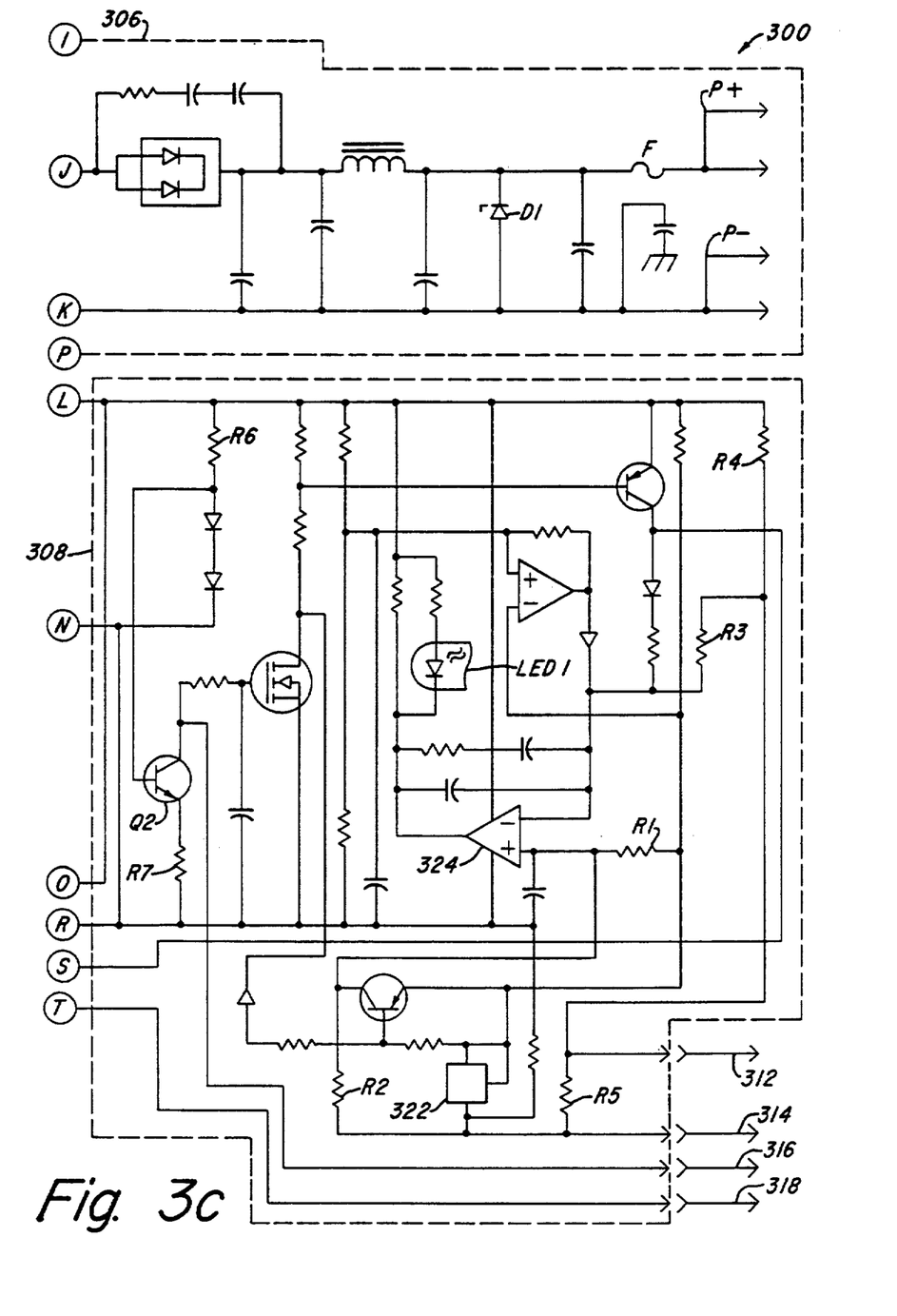

FIG. 3 shows a schematic drawing of an exemplary embodiment of charger 300. Primary circuit 302 is an AC-DC adapter for converting AC wall current into DC voltage. Primary circuit 302 includes a transformer and a bridge and other circuitry, which are not important for a full understanding of the present invention, and are left for the skilled artisan to implement. On the opposite side of primary circuit 302 is power rectifier and filter circuit 306, which include power outputs P+ and P− for connection to either battery pack 400 or computer 200, or both. Typically, prior charging systems used steering diodes, which would provide protection of the electronic device in case either the battery pack or the charging system failed and supplied too high a voltage or current to an electronic device, which failure could destroy the device. To compensate for the lack of steering diodes, fuse F is added between outputs P+ and P−. In addition, diode D1 is placed between P+ and P− to provide additional protection in the event of over-voltage at P+ due to failure of control circuitry 308A or 308B.

Connected to filter 306 is charge sensing and control circuit 308. Charge sensing and control circuit 308 comprises two parts, control circuitry 308A and control circuitry 308B. Control circuitry 308A is directly connected to power rectifier and filter 306, while control circuitry 308B is directly connected to primary 302. Control circuitry 308A and 308B are coupled together via light emitting diode (LED) 1, which is part of control circuitry 308A, and light transducer LQ 1, which is part of control circuitry 308B. Control circuitry 308B further comprises a pulsewidth invertor 309, which is a current mode pulsewidth modulated flyback invertor. Invertor 309 interacts with primary circuit 302 to set the pulsewidth at a duty cycle that will, when rectified and integrated by filter 306, maintain the desired output voltage or current.

Control circuit 308A includes several connectors such as current sense 312, common sense 314, charge enable 316, and rapid charge 318. Connectors 312, 314, 316, 318, provide connection between charger 300 and battery pack 400. Also connected to control circuitry 308A and to rapid charge connector 318 is signal control circuitry 310. Signal control circuitry 310 comprises an LED 2 connected to a 555 timer square wave generator circuit 320. LED 2 is used to signal the battery charging state to the user.

A description of control circuitry 308A and its operation is now given. A reference circuit 322, having pins 1 to 8 and coupled between P+ and P− and coupled to current sense connector 312, provides a reference voltage equal to about 2.5 volts (V) at its output pin 1. The 2.5 V is divided by R1 and R2 to produce a 200 mV reference voltage at the input of error amplifier 324 at pin 3, which is coupled between reference circuit 322 and filter 306 and includes pins 1 to 5. When battery pack 400 is installed, the voltage between current sense line 312 and common sense line 314 is presented to error amplifier 324, at pin 2 through resistor R3. Both the voltages at error amplifier 324 pins 2 and 3 are measured with respect to reference circuit 322, pin 2, which provides a common ground. If the voltage on current sense line 312 is at a level different from the 200 mV at primary 302 pin 3, the output at pin 1 of error amplifier 324 causes charger 300 to increase or decrease its output accordingly to maintain constant current through battery pack 400 sufficiently enough to impress 200 mV across a current sense resistor in battery pack 400. Error amplifier 324 pin 1 sets a current through LED 1, which current causes LQ 1 to control invertor 309 to provide a proper pulsewidth to maintain the desired current.

When battery pack 400 is removed, a voltage applied to pin 2 of error amplifier 324 is compared to the 200 mV reference voltage at pin 3. This voltage is divided by resistors R4 and R5 from the voltage at wire 326. The voltage at wire 326 is an image of the charger output voltage at P+. With the battery removed, error amplifier 324 pin 1 sets the current in LED 1 to maintain constant voltage to computer 200. The operation of LQ 1 and invertor 309 are the same as above when controlling current. The proper mode (current or voltage) is automatically selected upon removal of the battery by comparing voltage from wire 326, instead of voltage from the battery, to the 200 mV reference.

This dual mode operation allows for a more controlled charger output voltage by eliminating having the charging current regulator in series with the battery. An added advantage is that a single output for both the battery charging and operating voltage for the computer replaces the need for separate outputs for both. Furthermore, this eliminates the need for steering diodes, which otherwise waste power when placed in the path of the battery and the computer and also increase the required operating range for the charger. Moreover, the computer is no longer an integral part of the regulating feedback path; therefore, charger 300 and battery pack 400 can operate independently of computer 200, which means that charger 300 can be used as a stand-alone rapid charger for battery pack 400.

Turning now to the battery, FIG. 4 provides a schematic diagram of an exemplary embodiment of battery pack 400. In addition to battery 402 and feedback control circuitry 404, battery pack 400 includes connectors for connection to computer 200 and charger unit 300 via connectors P+, P−, 312, 314, 316, and 318. A second type of connector, a Hosiden connector 410 is provided and duplicates the same connections as P+, P1, 312–318 for mounting battery pack 400 directly on charger unit 300 to provide a rapid charge of battery pack 400 only. Connector 410 also allows the battery to be worn on a belt and connected to computer 200 through a cable. Feedback control 404 further comprises charge control circuit 406 and charge monitoring circuit 408.

Monitoring circuit 408 may implement one of several type of charge monitoring devices known in the art. For example, monitoring circuit 408 may use the technique of observing the temperature change within the battery and change charging status based on selected temperature settings. Another technique may observe the $-\Delta V$ value to determine charge state. Yet still, the technique of timing the charging state may also be used. Any combination of the above systems may be used for improved accuracy and reliability. The charging states may also include rapid charge, slow charge and trickle charge.

The particular monitoring circuitry used for illustration in FIG. 4 corresponds to that of a temperature sensing system. Monitor circuit 408 includes an ambient temperature sensor 412 and a battery temperature sensor 414. Voltage from both sensors 412 and 414 are compared at rapid charge temperature threshold circuit or comparitor 416. Both temperature sensors 412 and 414 are further coupled to absolute temperature comparitor 418. Monitor circuit 408 is activated when battery pack 400 is connected to charger unit 300 and charger unit 300 is on. Under these conditions, and when charge enable connector 316 is low, transistor Q3 is on. At this point, diode D2 serves as a voltage reference that establishes three offset voltages. Two offset voltages from pins 3 and 2 of diode D2 provide voltage offset for the two temperature sensors 412 and 414, respectively. The third voltage offset provides a reference for absolute temperature comparitor 418. Ambient temperature sensor 412 is offset at an equivalent positive ten degrees Celsius (10° C.) with respect to battery temperature sensor 414. Output pins 2 of ambient sensor 412 and battery temperature sensor 414 are compared at pin inputs 2 and 3, respectively, of comparitor 416. If input 2 becomes greater than input 3 at comparitor 416, pin output 3 of comparitor 416 goes low, causing itself to latch in that state through diode D4. If the output of battery sensor 416 reaches the absolute temperature level set at comparitor 418, the output of comparitor 418 will go low, but will not latch in that state. As the temperature decreases, the output from comparitor 418 will then go high.

If either output of comparitor 416 or comparitor 418 goes low, this causes the battery current to be set at a trickle charge rate. When the battery is in a rapid charging state, a current sense resistor is established comprising R8 in series with the resistance of transistor Q4. When transistor Q4 turns off by either output of comparitor 416 or comparitor 418 going low, the current sense voltage is across resistor R8 in series with R9. The voltage impressed across either of these sense resistors, R8 in series with the resistance of Q4, or R8 in series with R9, is returned to charger 300 as a normal mode voltage measured between current sense line 312 and common sense line 314. This voltage is compared in charger 300 to a reference (see FIG. 3) to maintain the desired constant charging rate.

When a charge is absent from charge enable connector 316, transistor Q3 turns off, disabling the control circuitry 404, and transistor Q5 turns on, which bypasses the sense resistors, to improve operating efficiency while transferring the charge from battery 402 to power computer 200. Transistor Q6, when on, enables rapid charge connector 318 to activate signal control circuitry 310 of charger 300. Furthermore, control circuitry 406 senses the presence of charger unit 300 when transistor Q2 turns on with current through resistor R6 of control circuitry 308A (FIG. 3). The collector current of Q2 is limited by emitter resistor R7 so that if charge enable connector 316 is forced high by computer 200, charger 300 powers down and places battery pack 400 in a mode of supplying current to computer 200. This allows computer 200 to drain battery 402. When a low battery voltage is sensed, computer 200 provides a low battery detection signal by means of battery voltage monitors within the computer, and returns control of Q2 to charger 300 to begin recharging battery 402. This allows the system to condition battery 402 by discharging to the lowest allowable voltage of battery 402, and then begin fully recharging it. This procedure erases the "memory effect," which is a reduced charge storage ability due to repeated incomplete discharge cycles.

Other embodiments of the present invention are apparent from the preceding description. For example, the charger system may replace the AC/DC converter with a DC/DC convertor. Other embodiments of the invention embodying the same or equivalent principals may be used and structural changes may be made as desired by those skilled in the art without departing from the present invention. Accordingly, the described embodiments are in no way intended to limit the scope of the invention except as limited by the following claims.

What is claimed is:

1. A power charger apparatus used for supplying electrical power to an electrical device for operation or to a battery for charging, or both, comprising:
   a primary power supply for supplying power from an external power source to the power chafer apparatus;
   a power converter coupled to the primary power supply for converting the power received by the primary power supply from the external power source into a form usable by the power charger apparatus for operating the device or for charging the battery, or both;
   a power controller coupled to the power converter for controlling the power applied to the device or the battery, when coupled to the device, or both;
   a charge rate sensor connected to the battery and the power controller for determining the rate of charge of the battery and for powering the device upon detecting that no battery is present; and
   a variable resistance, coupled to the charge rate sensor for allowing switching between full battery charge, trickle battery charge, or power discharge of the battery;
   wherein there is an uninterrupted current path between the battery and the device during full battery charge, trickle battery charge and power discharge of the battery.

2. The invention according to claim 1 wherein the charge rate sensor comprises a voltage detector for measuring the voltage across the resistance while the battery is charging.

3. The invention according to claim 1 further comprising a charge monitor connected to the battery and coupled to the power controller for monitoring the battery during charging and signaling the power controller the state of charge on the battery.

4. The invention according to claim 3 wherein the charge monitor and power controller place the battery into either a rapid-charge, trickle charge, or power discharge state, depending upon the monitoring of the charge monitor.

5. The invention according to claim 3 wherein the charge monitor is a temperature sensing system.

6. A power charger apparatus for supplying electrical power to an electrical device for operation or to a battery for charging, or both, wherein the device, battery and apparatus are coupled in parallel with one another, comprising:

a primary power source for supplying power from an external power source to the power charger apparatus;
a power converter coupled to the primary power supply for converting the power received by the primary power supply from the external power source into a form useable by the power charger apparatus for operating the device or for charging the battery, or both;
a power controller coupled to the power converter for controlling the power applied to the device or the battery, or both; and
a charge rate sensor connected in series with the battery and coupled to the power controller for defining the rate of charge of the battery and for powering the device upon detecting no battery is present; and,
a charge monitor, having a variable resistance for switching between rapid charge, trickle charge, or discharge of the battery and connected to the battery and coupled to the charge rate sensor for monitoring the battery during charging and signaling the charge rate sensor the state of the charge on the battery;,
wherein there is an interrupted current path between the battery and the device during rapid charge, trickle charge, and discharge of the battery.

7. The invention according to claim 6 wherein the power controller comprises a signal amplifier having a constant signal input and a charge rate input from charge rate sensor and a control output, which is based upon the difference between the constant signal input and the charge rate input, for controlling the current in the battery.

8. The invention according to claim 6 wherein the primary power supply comprises a pulsewidth invertor responsive to the power controller for providing a proper pulsewidth to maintain the desired current.

9. The invention according to claim 7 wherein the signal amplifier provides a constant signal output based on a reference signal from the device for maintaining a desired voltage to the device, the reference signal being responsive to an absence of the battery.

10. The invention according to claim 6 further comprising a signal controller coupled to the power controller for operating a signal device to indicate the apparatus' operating state.

11. A power charger apparatus used for supplying electrical power to an electrical device for operation or to a battery for charging, or both, comprising:
   a primary power supply for supplying power from an external power source to the power charger apparatus;
   a power converter coupled to the primary power supply for converting the power received by the primary power supply from the external power source in to a form useable by the power charger apparatus for operating the device of for charging the battery, or both;
   a power controller coupled to the power converter for controlling the power applied to the device or the battery, or both;
   a charge rate sensor connected to the battery and coupled to the power controller for determining the rate of charge of the battery and for powering the device upon detecting no battery is present; and
   a variable resistance, coupled to charge rate sensor, such that, regardless of the rate of charge of the battery, a constant current is maintained for charging the battery, while the voltage across the device and battery is allowed to float;

wherein there is an uninterrupted current path between the battery and the device during rapid charging, trickle charging, or discharging of the battery.

12. The invention according to claim 11 wherein the charge rate sensor comprises a voltage detector for measuring the voltage across the resistance while the battery is charging.

13. The invention according to claim 11 further comprising a charge monitor connected to the battery and coupled to the power controller for monitoring the battery during charging and signaling the power controller the state of charge on the battery.

14. The invention according to claim 13 wherein the charge monitor and power controller place the battery into either a rapid-charge, trickle charge, or power discharge state, depending upon the monitoring of the charge monitor.

15. A power charger apparatus used for supplying electrical power to an electrical device for operation or to a battery for charging, or both, comprising:
- a primary power supply for supplying power from an external power source to the power charger apparatus;
- a power converter coupled to the primary power supply for converting the power received by the primary power supply from the external power source into a form usable by the power charger apparatus for operating the device or for charging the battery, or both;
- a power controller coupled to the power converter for controlling the power applied to the device or the battery, or both;
- a charge rate sensor connected to the battery and coupled to the power controller for determining the rate of charge of the battery and for powering the device upon detecting no battery is present; and
- a variable resistance, coupled to the charge rate sensor, for maintaining, regardless of the rate of charge of the battery, a single predetermined constant current for charging the battery while the voltage across the device and battery is allowed to float;

wherein there is an uninterrupted current path between the battery and the device during charging of the battery.

16. The invention according to claim 15 wherein the charge rate sensor comprises a voltage detector for measuring the voltage across the resistance while the battery is charging.

17. The invention according to claim 15 further comprising a charge monitor connected to the battery and coupled to the power controller for monitoring the battery during charging and signaling the power controller the state of charge on the battery.

18. The invention according to claim 17 wherein the charge monitor and power controller place the battery into either a rapid-charge, trickle charge, or power discharge state, depending upon the monitoring of the charge monitor.

* * * * *

UNITED STATES PATENT AND TRADEMARK OFFICE
CERTIFICATE OF CORRECTION

PATENT NO. : 5,371,456
DATED      : December 6, 1994
INVENTOR(S) : Gerald L. Brainard It is certified that error appears in the above-indentified patent and that said Letters Patent is hereby corrected as shown below:

Col. 2, line 8, "it" should be --is--.

Col. 7, claim 1, line 25, "chafer" should be --charger--.

Col. 8, claim 6, line 15, "defining" should be --determining--.

Col. 8, claim 6, line 25, "interrupted" should be --uninterrupted--.

Signed and Sealed this

Fourteenth Day of March, 1995

*Attest:*

BRUCE LEHMAN

*Attesting Officer*     Commissioner of Patents and Trademarks